(12) United States Patent
Wen et al.

(10) Patent No.: US 11,416,288 B2
(45) Date of Patent: Aug. 16, 2022

(54) METHOD, DEVICE AND COMPUTER PROGRAM PRODUCT FOR SERVICE MANAGEMENT

(71) Applicant: EMC IP Holding Company LLC, Hopkinton, MA (US)

(72) Inventors: Jian Wen, Chengdu (CN); Yi Wang, Chengdu (CN); Xing Min, Chengdu (CN); Haitao Li, Chengdu (CN); Lili Lin, Chengdu (CN); Longcai Zou, Chengdu (CN); Rong Qiao, Chengdu (CN); Hao Yang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 296 days.

(21) Appl. No.: 16/723,813

(22) Filed: Dec. 20, 2019

(65) Prior Publication Data
US 2020/0409752 A1   Dec. 31, 2020

(30) Foreign Application Priority Data
Jun. 28, 2019   (CN) .......................... 201910575673.2

(51) Int. Cl.
*G06F 9/46* (2006.01)
*G06F 9/48* (2006.01)
(Continued)

(52) U.S. Cl.
CPC .......... *G06F 9/4881* (2013.01); *G06F 9/3877* (2013.01); *G06F 9/4837* (2013.01); *G06F 9/5027* (2013.01); *G06F 2209/5022* (2013.01)

(58) Field of Classification Search
CPC .... G06F 9/4881; G06F 9/4837; G06F 9/5027; G06F 9/3877; G06F 2209/5022; G06F 9/4887; G06F 11/3051
See application file for complete search history.

(56) References Cited

U.S. PATENT DOCUMENTS

9,973,547 B1 *   5/2018   Simms ................ H04L 67/2842
10,261,935 B1 *   4/2019   Habusha ............. G06F 11/3433
(Continued)

*Primary Examiner* — Adam Lee
(74) *Attorney, Agent, or Firm* — Womble Bond Dickinson (US) LLP (57) ABSTRACT

Embodiments of the present disclosure relate to a method, device and computer program product for managing a service. The method comprises in response to processor credits for the service reaching threshold credits at a first time instant (t1), determining a second time instant when a first operation for the service is to be performed. The method further comprises determining, based on a set of historical processor credits between the first time instant and the second time instant, first processor credits related to a second set of time periods which is between the first time instant and second time instant. The method further comprises determining, based on a first time length from the first time instant to the second time instant, a second time length of the first set of time periods and a third time length of the second set of time periods, second processor credits that can be obtained between a third time instant when the second set of time periods ends and the second time instant; in response to the first, second and third processor credits satisfying a predetermined condition, performing the second operation within the second set of time periods. The method may increase the time for performing the second operation without affecting the first operation.

15 Claims, 5 Drawing Sheets

(51) Int. Cl.
  *G06F 9/50* (2006.01)
  *G06F 9/38* (2018.01)

(56) References Cited

U.S. PATENT DOCUMENTS

2011/0200017 A1\* 8/2011 Amalfitano ........... H04W 28/24
  370/335
2017/0364132 A1\* 12/2017 Gendler .................. G06F 1/324
2019/0236210 A1\* 8/2019 Makaremi ............... H04L 67/42

\* cited by examiner

METHOD, DEVICE AND COMPUTER PROGRAM PRODUCT FOR SERVICE MANAGEMENT

CROSS-REFERENCE TO RELATED APPLICATION

This patent application claims priority, under 35 U.S.C. § 119, of Chinese Patent Application No. 201910575673.2, filed Jun. 28, 2019, entitled "METHOD, DEVICE AND COMPUTER PROGRAM PRODUCT FOR SERVICE MANAGEMENT."

FIELD

Embodiments of the present disclosure relate to the field of computers, and specifically to a method, device and computer program product for service management.

BACKGROUND

With rapid development of storage technologies a lot of data needs to be backed up to a backup storage device through a backup system. The stored data is made more secure by backing up the data to the backup storage device. When the data is damaged, the data may be recovered from the backup storage device through the backup system, thereby enhancing the security of the data.

In the backup system, besides the normal backup jobs, there are many maintenance jobs as well. For example, garbage collection for the backup system is one of the typical maintenance jobs. In the modern system, sometimes data analysis is taken as one of the maintenance jobs. However, there are still many problems to be solved in a system, such as the backup system, with periodical operations and non-periodical operations.

SUMMARY

Embodiments of the present disclosure provide a method, device and computer program product for managing a service.

According to a first aspect of the present disclosure, there is provided a method of managing a service. The method comprises in response to processor credits for the service reaching threshold credits at a first time instant (t1), determining a second time instant (t2) when a first operation for the service is to be performed, the processor credits indicating a time length in which a processor for the service runs at a utilization rate exceeding a threshold utilization rate. The method further comprises determining, based on a set of historical processor credits related to a first set of time periods ($t_{p1} \ldots t_{pn}$) between the first time instant (t1) and the second time instant (t2) for performing the second operation for the service, first processor credits related to a second set of time periods ($t_{pn+1}$) between the first time instant (t1) and the second time instant (t2) for performing a second operation, the second set of time periods ($t_{pn+1}$) being later than the first set of time periods ($t_{p1} \ldots t_{pn}$). The method further comprises determining, based on a first time length from the first time instant (t1) to the second time instant (t2), a second time length of the first set of time periods ($t_{p1} \ldots t_{pn}$) and a third time length of the second set of time periods ($t_{pn+1}$), second processor credits that can be obtained between a third time instant (t3) when the second set of time periods ($t_{pn+1}$) ends and the second time instant (t2). The method further comprises in response to the first, second and third processor credits satisfying a predetermined condition, performing the second operation within the second set of time periods ($t_{pn+1}$), the third processor credits being current processor credits determined from the threshold credits and the set of historical processor credits.

According to a second aspect of the present disclosure, there is provided an electronic device for managing a service. The electronic device comprises: a processor; and a memory having computer program instructions stored thereon, the computer program instructions when executed by the processor, causing the electronic device to perform acts comprising: in response to processor credits for the service reaching threshold credits at a first time instant (t1), determining a second time instant (t2) when a first operation for the service is to be performed, the processor credits indicating a time length in which a processor for the service runs at a utilization rate exceeding a threshold utilization rate; determining, based on a set of historical processor credits related to a first set of time periods ($t_{p1} \ldots t_{pn}$) between the first time instant (t1) and the second time instant (t2) for performing the second operation for the service, first processor credits related to a second set of time periods ($t_{pn+1}$) between the first time instant (t1) and second time instant (t2) for performing a second operation, the second set of time periods ($t_{pn+1}$) being later than the first set of time periods ($t_{p1} \ldots t_{pn}$); determining, based on a first time length from the first time instant (t1) to the second time instant (t2), a second time length of the first set of time periods ($t_{p1} \ldots t_{pn}$) and a third time length of the second set of time periods ($t_{pn+1}$), second processor credits that can be obtained between a third time (t3) when the second set of time periods ($t_{pn+1}$) ends and the second time instant (t2); and in response to the first, second and third processor credits satisfying a predetermined condition, performing the second operation within the second set of time periods ($t_{pn+1}$), the third processor credits being current processor credits determined from the threshold credits and the set of historical processor credits.

According to a third aspect of the present disclosure, there is provided a computer program product. The computer program product is tangibly stored on a non-volatile computer-readable medium and comprises machine-executable instructions. The machine-executable instructions, when executed, cause the machine to execute steps of the method according to the first aspect of the present disclosure.

BRIEF DESCRIPTION OF THE DRAWINGS

Through the more detailed description of some embodiments of the present disclosure with reference to the accompanying drawings, the above and other objects, features and advantages of the present disclosure will become more apparent, wherein the same reference generally refers to the same components in exemplary embodiments of the present disclosure.

Throughout the figures, the same or corresponding reference numbers represent the same or corresponding parts.

DETAILED DESCRIPTION

Implementations of the present disclosure will be described in more detail hereunder with reference to figures. Although figures show some implementations of the present disclosure, it should be appreciated that the present disclosure may be implemented in many forms and the present disclosure should not be understood as being limited to implementations illustrated here. On the contrary, these implementations are provided here to enable more thorough and complete understanding of the present disclosure. It should be appreciated that figures and implementations of the present disclosure are only used for exemplary purposes and not used to limit the protection scope of the present disclosure.

As used herein, the term "includes" and its variants are to be read as open terms that mean "includes, but is not limited to." The term "based on" is to be read as "based at least in part on." The term "an example embodiment" or "the example embodiment" is to be read as "at least one example embodiment". Terms such as "first" and "second" may refer to different or identical objects. The text below might include other explicit and implicit definitions.

The principles of the present disclosure will be described with reference to several example embodiments shown in the figures. Although figures show preferred embodiments of the present disclosure, it should be appreciated that these embodiments are described only to enable those skilled in the art to better understand and thereby implement the present disclosure, not to limit the scope of the present disclosure in any manner.

There are at least two types of operations in some data processing systems, wherein the first operation is a periodically performed operation and the second operation is a non-periodically performed operation. Take the backup system as an example. In the backup system, data is backed up by the periodically-performed backup operation. In addition, there are also maintenance jobs in the backup system. These operations will consume processor resources (such as virtual processor resources). Maintenance jobs for the backup system are usually performed when no backup jobs are in progress to avoid impact on other high-priority jobs.

In some cloud service platforms, maintenance jobs usually run a fixed scheduled duration. However, it is not working good enough in an burstable performance instance in a cloud (e.g., AWS cloud) service. The burstable performance instance is one type of instance which may provide a baseline level of CPU performance and can be bursted to a higher level when required by the workload. The key to get the higher-level burstable performance is to obtain a processor credit. The processor credit indicates a time length in which a processor for the service runs at a utilization rate exceeding a threshold utilization rate. One processor credit is equal to one vCPU running at 100% utilization for one minute. One processor credit also equate to the combinations of number of vCPUs, utilization, and time. For example, one processor credit is equal to one vCPU running at 50% utilization for two minutes, or two vCPUs running at 25% utilization for two minutes.

If a burstable performance instance uses fewer CPU resources than is required for baseline performance (such as when it is idle), the processor credits will be obtained, and the obtained processor credits are accrued. If a burstable performance instance needs to burst with a utilization rate exceeding the threshold utilization rate (also referred to as the baseline performance level), it spends the accrued credits. The more credits that a burstable performance instance has accrued, the more time it may burst beyond its baseline when more performance is needed.

However, the processor credits are not always accrued. The reason is that for each service, it has the largest processor credits, namely, the threshold credits. When the threshold credits are reached, the processor credits cannot continue to be accrued. However, in a backup system, customers might run backup jobs on a weekly or monthly basis instead of a daily basis. Therefore, the backup server might be idle or running for a long time with a low CPU workload. The accrued processor credits at this time might reach the threshold credits. However, after the threshold credits are reached, although the running speed is lower than the baseline performance, the processor credits cannot be obtained any more. As such, a calculation capability for the service is limited, and the time that the processor runs over the baseline performance is limited, and the utilization rate of the computing resources is reduced.

In order to solve the above problem, the present disclosure proposes a method of managing a service. In the method, in response to processor credits for the service reaching threshold credits at a first time instant, a second time instant when the periodical first operation is to be performed is determined. Then, the processor credits to be consumed in a second set of time period is determined based on a set of historical processor credits consumed for performing the second operation within a plurality of historical time periods between the first time and second time. Then, the processor credits that may be obtained in remaining time periods are determined. Then, whether the second operation is performed in the second set of time period is determined based on the current processor credits, the processor credits to be consumed and the processor credits that may be obtained. It is possible to, through the above method, not only ensure that there are the maximum processor credits at the second time to perform the first operation, but also enable use of processor credits as many as possible to perform the second operation, thereby improving the computing capability. As more computing capability is used to process more jobs, the utilization of computing resources is increased.

Figure 1:
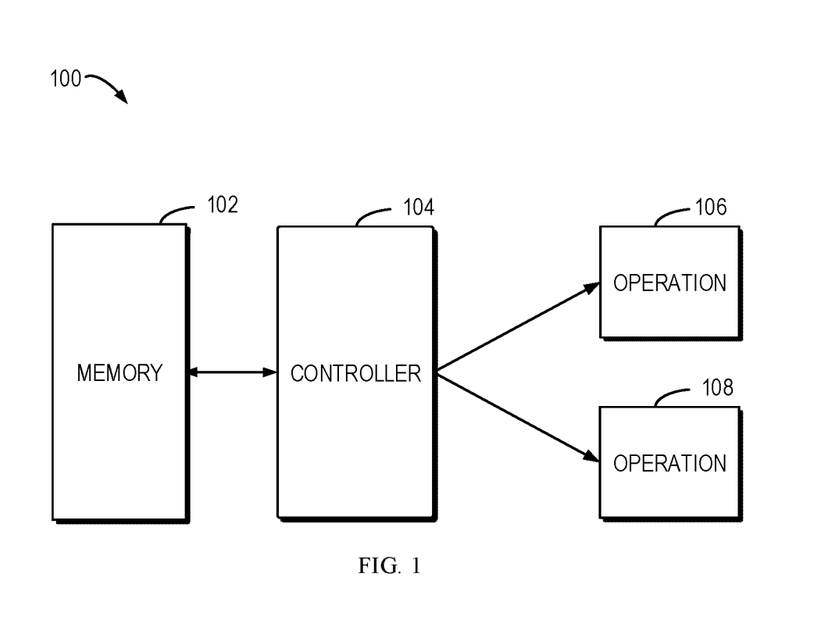
FIG. 1 illustrates a schematic diagram of an example environment 100 in which devices and/or methods according to embodiments of the present disclosure may be implemented.

FIG. 1 illustrates a schematic diagram of an example environment 100 in which devices and/or methods according to embodiments of the present disclosure may be implemented. The example environment 100 includes a memory 102 and a controller 104.

The memory 102 may be used to store data or information used by the controller 104. The memory 102 includes, but is not limited to, Random Access Memory (RAM), Read Only Memory (ROM), Erasable Programmable Read Only Memory (EEPROM), flash memory, or other memory technologies, or any other storage media that are used to store desired information and may be accessed by the controller 104.

In some embodiments, the memory 102 stores information of an operation 106 periodically performed in the service. The operation 106 is sometimes referred to as the first operation for ease of description. In an example, the memory 102 stores a execution time of the periodically-performed first operation, for example, a certain time instant of a certain day of a week to perform the first operation. In one example, when the service is a backup service, in the backup system, a backup operation is performed for some data at a certain time instant in a month. In another example, in a database system, data storage or updating operation is performed at a pre-set time.

In some embodiments, the memory 102 stores a time instant when the periodically-performed first operation is performed last time and a performance period thereof. A second time instant when the first operation will be performed is determined through the time instant of last performance and the performance period.

Alternatively or additionally, a preset predetermined execution time instant or the time instant of last performance and the performance period for the first operation are stored in one group to facilitate management.

In some embodiments, the memory 102 stores historical time instant of the first operation triggered periodically by a user from a served client to be performed. The controller 104 may determine the time instant of performing the periodically-performed first operation from the historical time instant of the user periodically triggering the first operation and an interval time. For example, in the backup system, a time instant of next back operation is determined through historical operation time instant of the user periodically triggering a backup operation via a backup client and an interval time. The above examples are only intended to describe the present disclosure, not to specifically limit the present disclosure.

The controller 104 is configured to control operations for the service based on data or information obtained from the memory 102. In some embodiments, the controller 104 includes, but is not limited to, a virtual processor or processor, the processor including a single core processor or a multi-core processor. In some embodiments, the controller 104 includes a Field Programmable Gate Array (FPGA), a Composite Programmable Logic Device (CPLD), an Application Specific Integrated Circuit (ASIC), a System on Chip (SoC), or combinations thereof. The above examples are only intended to describe the present disclosure, not to specifically limit the present disclosure. Those skilled in the art may set a suitable controller as needed.

In some embodiments, the controller 104 may determine the next time instant for performing the first operation based on a execution time instant of periodically-performed first operation or historical execution time instant of periodical operations obtained from the memory 102. For example, in the backup system, the processor may determine the operation time instant of the backup operation according to the stored execution time instant of the periodical backup operations or according to historical operation time instant of user-triggered periodical operations.

The controller 104 further controls the execution of the backup operation. Alternatively or additionally, the controller 104 further controls other operations than the periodically-performed first operation, such as a maintenance operation. In one example, the controller 104 in the backup system also performs maintenance jobs for backup data, for example, the storage space management.

The operation 106 is used to indicate a periodically-performed operation, and is also referred to as a first operation for convenience of description. For example, in the backup system, the first operation includes periodical backup operations. An operation 108 is another operation different from the periodically-performed operation, and is also referred to as a second operation for convenience of description. In one example, in the backup system, the second operation is a maintenance job that may be performed at any time without performing the backup operation. Alternatively or additionally, the execution of both the operation 106 and operation 108 consumes processor credits.

The schematic diagram of the example environment 100 in which devices and/or methods according to embodiments of the present disclosure may be implemented is described above with reference to FIG. 1. A process for controlling the operation of a service is described below with reference to FIG. 2 and FIG. 3, wherein FIG. 2 illustrates a flow chart of a method 200 of managing a service according to an embodiment of the present disclosure, and FIG. 3 illustrates a schematic diagram of an example 300 of an operation-related time according to an embodiment of the present disclosure.

Figure 2:
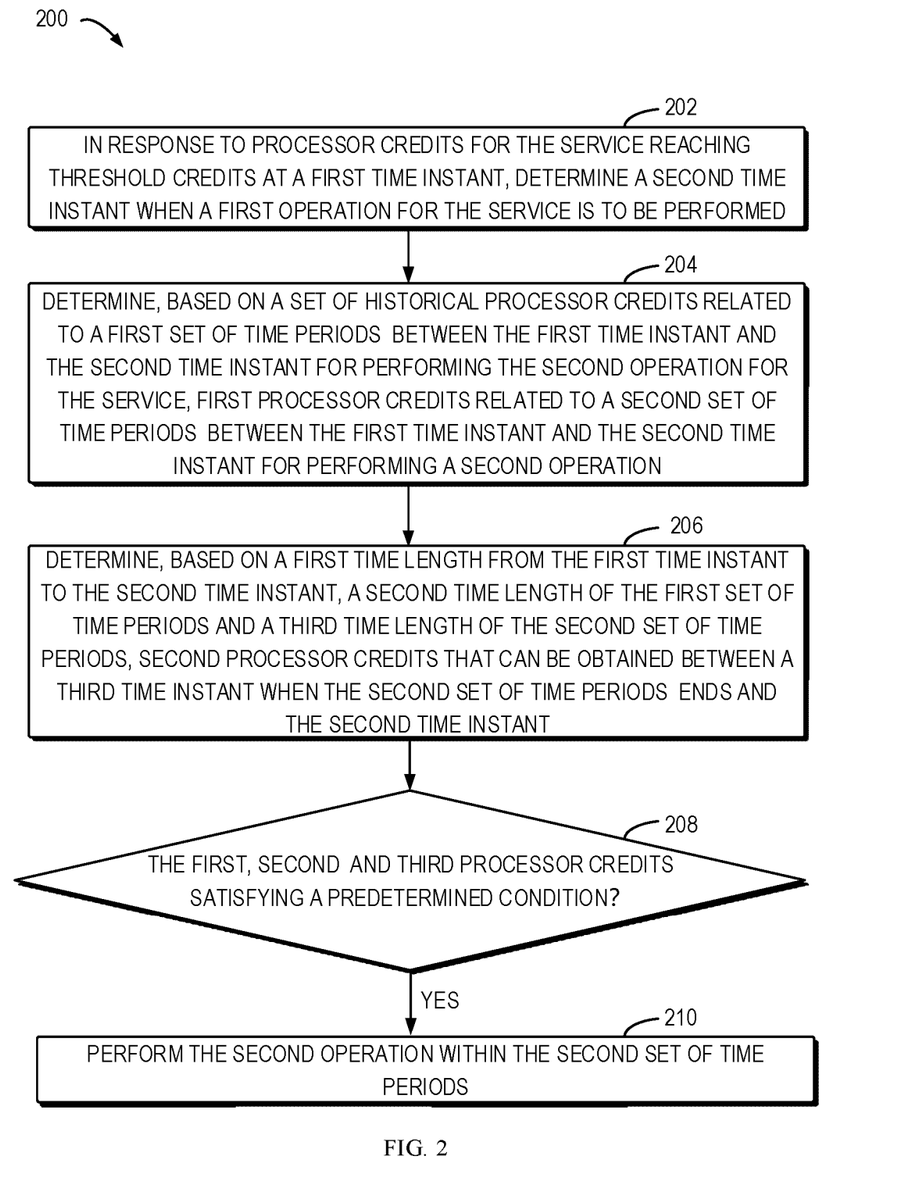
FIG. 2 illustrates a flow chart of a method 200 of managing a service according to an embodiment of the present disclosure.
Figure 3:
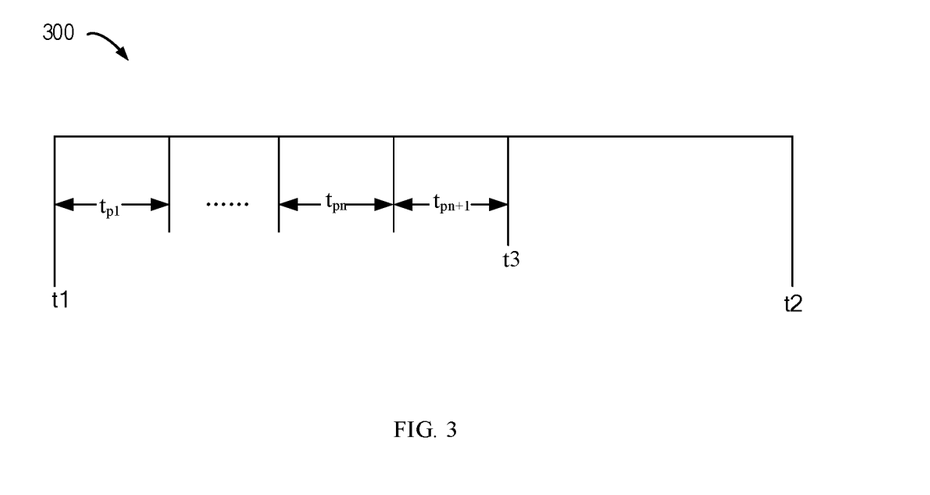
FIG. 3 illustrates a schematic diagram of an example 300 of an operation-related time according to an embodiment of the present disclosure.

As shown in FIG. 2, at block 202, the controller 104 in response to processor credits for the service reaching threshold credits at a first time instant (e.g., a first time t1 in FIG. 3), determines a second time instant (e.g., a second time t2 in FIG. 3) when the first operation for the service is to be performed, the processor credits indicating a time length in which a processor for the service runs at a utilization rate exceeding a threshold utilization rate. In some embodiments, the first operation is a periodically-performed operation. In some embodiments, the controller 104 determines the second time instant t2 when the first operation is to be performed, based on a received predetermined execution time instant of the periodical operation and/or from historical execution time instant and a time interval of the user-triggered periodical operation.

In one example, when the service is the backup service, in the backup system, the first operation is a periodically-performed backup operation. When the backup system is running in an idle state, the processor credits may be accrued. At the first time instant t1 when the processor credits of the backup system are accrued to the threshold, the controller 104 determines the second time instant t2 when the periodically-performed first operation is to be performed. In one example, when the service is the database service, the first operation is a periodically-performed storage operation or updating operation, and the second operation is a non-periodically-performed other data operation.

At block 204, the controller 104 determines, based on a set of historical processor credits related to a first set of time periods (e.g., a first set of time periods $t_{p1} \ldots t_{pn}$, wherein n is a positive integer) between the first time instant (t1) and the second time instant (t2) for performing the second operation for the service, processor credits related to a second set of time periods (e.g., a second set of time periods $t_{pn+1}$ in FIG. 3) between the first time instant t1 and second time instant t2 for performing the second operation, the processor credits being also referred to as first processor credits later to facilitate description. The second set of time periods $t_{pn+1}$ is later than the first set of time periods $t_{p1} \ldots t_{pn}$. In an example, a time length of each time period in the first set of time periods $t_{p1} \ldots t_{pn}$ and the second set of time periods $t_{pn+1}$ is the same. The above examples are only intended to describe the present disclosure, not to specifically limit the present disclosure. Those skilled in the art may set the time length of the time period as needed.

Upon predicting the first processor credits to be consumed in the second set of time period $t_{pn+1}$, the controller 104 determines the first processor credits through a set of historical processor credits consumed for performing the second operation in the first set of time periods $t_{p1} \ldots t_{pn}$. During each time period in the first set of time periods $t_{p1} \ldots t_{pn}$, historical processor credits are consumed to perform the second operation.

At block 206, the controller 104 determines, based on a first time length from the first time instant (t1) to the second time instant (t2), a second time length of the first set of time periods ($t_{p1} \ldots t_{pn}$) and a third time length of the second set of time periods ($t_{pn+1}$), second processor credits that can be obtained between a third time instant (e.g., a time t3 shown in FIG. 3) when the second set of time periods $t_{pn+1}$ ends and the second time instant t2.

In some embodiments, when the controller 104 determines the processor credits that may be obtained in a remaining time period from the third time t3 to the second time t2, it is necessary to determine a time length of the remaining time period by subtracting the second time length of the first set of time periods $t_{p1} \ldots t_{pn}$ in which the second operation is already performed and the time length of the second set of time periods $t_{pn+1}$ from the first time length between the first time t1 and second time t2, and then determine the processor credits that may be obtained in the remaining time period.

At block 208, the controller 104 determines whether the first, second and third processor credits satisfy a predetermined condition, wherein the third processor credits are current processor credits determined from the threshold credits and a set of historical processor credits. In some embodiments, when whether to perform the second operation in the second set of time periods $t_{pn+1}$ is determined, it is necessary to determine whether the processor credits at the second time t2 are greater than the threshold credits based on the first, second and third processor credits, to determine whether to perform the second operation in the second set of time periods $t_{pn+1}$.

Upon determining that the first, second and third processor credits satisfy the predetermined condition, at block 210, the controller 104 performs the second operation within the second set of time periods $t_{pn+1}$. In some embodiments, when it is determined that the processor credits in the second set of time period $t_{pn+1}$ are greater than the threshold based on the first, second and third processor credits, this indicates that even though certain processor credits are consumed by performing the second operation in the second set of time periods, the processor credits obtained in the later remaining time period can still ensure that there are processor credits greater than the threshold at the time t2. Hence, the second operation may be performed within the second set of time periods $t_{pn+1}$.

When the processor credits satisfy the predetermined condition, the second operation consuming the processor credits is performed. This ensure that there are threshold processor credits at the second time for the first operation and as many as possible processor credits are used to process the second operation. The above operation improves the computing capability, and more computing capability is used to process non-periodical maintenance jobs, and the utilization rate of the computing resources is improved.

The process of the operation of managing the service is described above with reference to FIG. 2 and FIG. 3. A more specific process of an operation of managing the service will be described below with reference to FIG. 3 and FIG. 4, wherein FIG. 4 illustrates a flow chart of a method 400 for managing a service according to an embodiment of the present disclosure.

Figure 4:
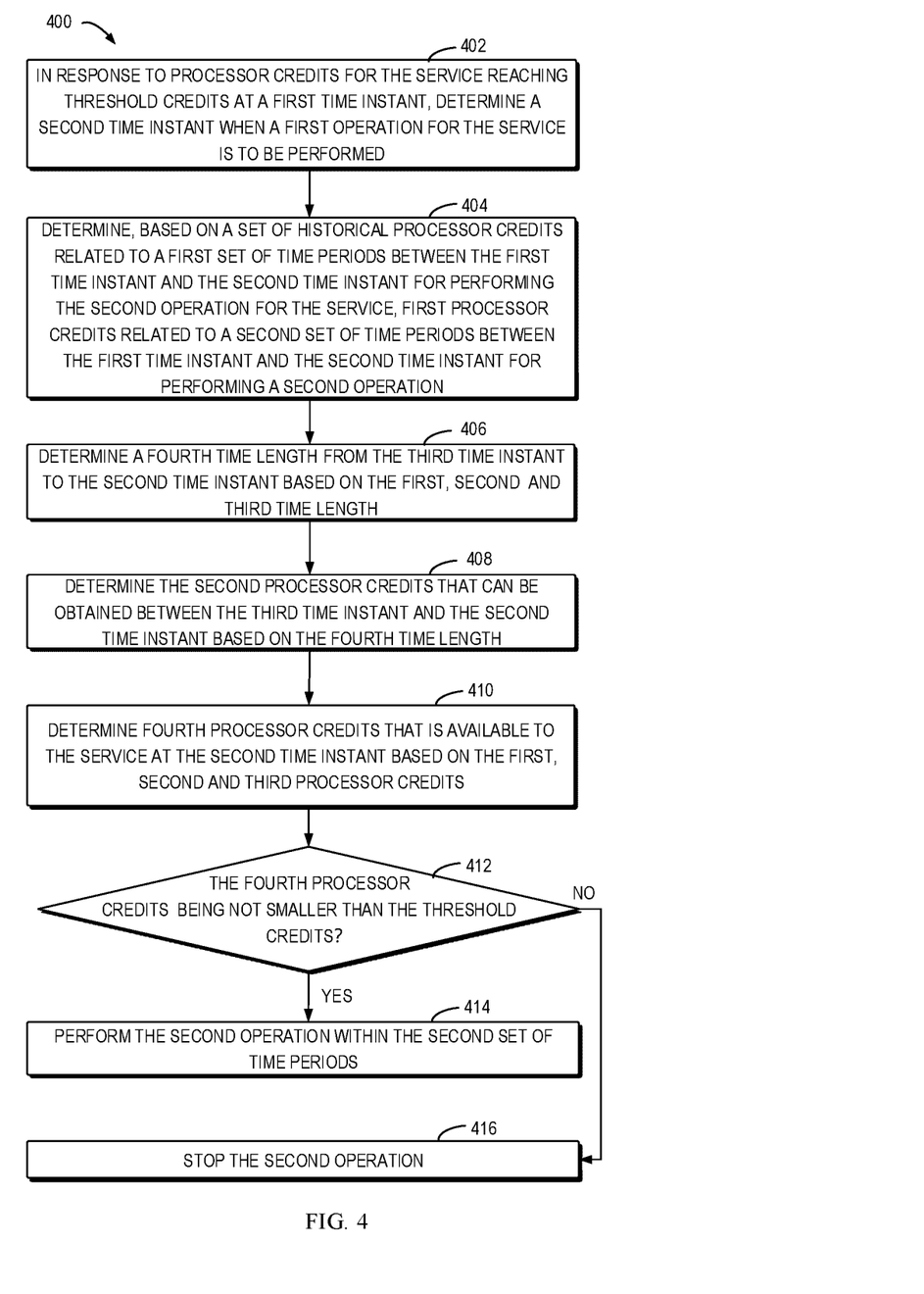
FIG. 4 illustrates a flow chart of a method 400 of managing a service according to an embodiment of the present disclosure.

As shown in FIG. 4, operations performed at block 402 and block 404 in FIG. 4 are the same as those performed at block 202 and block 204 in FIG. 2, and will not be detailed any more here.

At block 404, a manager 104 determines the first processor credits related to the second set of time periods $t_{pn+1}$ between the first time instant t1 and the second time instant t2 for performing the second operation. As shown in FIG. 3, during the time period between the first time instant t1 and second time instant t2, the controller 104 needs to predict the processor credits at the second time t2 at an interval of a predetermined time length $t_{pn}$. When the processor credits at the second time t2 is predicted, it is necessary to predict the processor credits to be consumed in the second set of time periods $t_{pn+1}$ according to the processor credits already consumed in the first set of time periods $t_{p1} \ldots t_{pn}$ consisting of n time periods. The processor credits to be consumed in the second set of time periods $t_{pn+1}$ may be calculated according to the following equation:

$$y_{n+1} = \alpha x_n + (1-\alpha) y_n \quad (1)$$

where n represents a positive integer, $x_n$ represents the processor credits actually consumed in the nth time period, $y_n$ represents predicted processor credits consumed in the nth time period, and $\alpha$ represents a smoothing coefficient, which ranges between 0 and 1. An actual value x1 is employed as an initial value y1 in the first time period of the first set of time periods.

The smoothing coefficient $\alpha$ is chosen between 0 and 1. When $\alpha$ is close to 1, it indicates that the latest value affects a prediction value more. When $\alpha$ is close to 0, it indicates that a previous value affects the prediction value more. When the smoothing coefficient $\alpha$ is determine, different values are selected in advance for a between 0 and 1. In an example, $\alpha$ may take 0.1, 0.2, 0.3, 0.4, 0.5, 0.6, 0.7, 0.8 and 0.9 respectively in advance. The above examples are only intended to describe the present disclosure, not to specifically limit the present disclosure. Those skilled in the art may set the value of a as needed.

The value of $\alpha$ that should be selected is determined through the following process. First, as for each $\alpha$ value, a difference between the processor credits $y_i$ predicted in the $i^{th}$ time period and the actually-consumed processor credits $x_i$ is calculated through the following equation:

$$e_i = y_i - x_i \quad (2)$$

where $i \in [1,n]$, n represents the number of the first set of time periods $t_{p1} \ldots t_{pn}$ in which the second operation is already performed. Then, a sum of squared errors SSE determined in the $i^{th}$ time period is calculated through the following equation:

$$SSE = \Sigma_{t=1}^{i}(y_t - x_t)^2 = \Sigma_{t=1}^{i} e_t^2 \quad (3)$$

where $y_t$ represents the processor credits predicted in the $t^{th}$ time period, and $x_t$ represents the processor credits actually consumed in the $t^{th}$ time period.

Then, a corresponding $\alpha$ value having a minimum SSE value is determined according to the SSE value for different $\alpha$ values, and then the processor credits to be consumed in the second set of time periods $t_{pn+1}$ is predicted through equation (1) based on the $\alpha$ value and its relevant prediction value.

It is possible to, through the above equation, ensure obtainment of a more accurate smoothing coefficient and thereby ensure the accuracy of the processor credits predicted in the second set of time periods.

Returning back to FIG. 4, at block 406, the controller 104 determines a fourth time length from the third time instant t3 to the second time instant t2, based on a first time length from the first time instant t1 to the second time instant t2, a second time length of the first set of time periods $t_{p1} \ldots t_{pn}$, and a third time length of the second set of time periods $t_{pn+1}$. In some embodiments, the controller 104 determines the fourth time length by subtracting the second time length and third time length from the first time length.

At block 408, the controller 104 determines the second processor credits that can be obtained between the third time instant t3 and the second time instant t2 based on the fourth time length.

In some embodiments, after determining the first time length, second time length and third time length, the controller 104 may calculate the processor credits $y_r$ that may be obtained between the third time instant t3 and the second time instant t2 based on the following equation:

$$y_r = m \times (T - t - t_p) \quad (4)$$

where m represents the processor credits that may be accrued within a unit time when the service is running at a utilization rate lower than the threshold utilization rate, T represents the first time length between the first time instant t1 and the second time instant t2, t represents the second time length for the first set of time periods $t_{p1} \ldots t_{pn}$, and $t_p$ represents the time length for the second group of time periods $t_{pn+1}$.

In some embodiments, the controller 104 calculates the processor credits $y_r$ that may be obtained between the third time instant t3 and the second time instant t2 based on the following equation:

$$y_r = \min(M, m \times (T - t - t_p)) \quad (5)$$

where M represents the threshold credits, min represents a minimum value, m represents the processor credits that may be accrued within a unit time when the service is running at a utilization rate lower than the threshold utilization rate, T represents the first time length between the first time instant t1 and second time instant t2, t represents the second time length for the first set of time periods $t_{p1} \ldots t_{pn}$, and $t_p$ represents the time length for the second group of time periods $t_{pn+1}$.

At the block 410, the controller 104 determines the fourth processor credits that is available to the service at the second time instant t2 based on the first, second and third processor credits. In some embodiments, the controller 104 determines the processor credits at the second time t2 by adding the second processor credits to be obtained to the current third processor credits, and then subtracting the first processor credits to be consumed to perform the second operation in the second group of time periods $t_{pn+1}$.

At block 412, the controller 104 determines whether the fourth processor credits are not smaller than the threshold credits. In some embodiments, the controller 104 determines whether the fourth processor credits are not smaller than the threshold through the following formula:

$$(m \times (T - t - t_p) + L - y_{i+1}) \geq M \quad (6)$$

where L represents the current processor credits, m represents the processor credits that may be accrued within a unit time when the service is running at a utilization rate lower than the threshold utilization rate, T represents the first time length between the first time instant t1 and second time instant t2, t represents the second time length for the first set of time periods $t_{p1} \ldots t_{pn}$, $t_p$ represents the time length for the second group of time periods $t_{pn+1}$, $y_{i+1}$ represents the processor credits to be consumed within the second set of time periods $t_{pn+1}$, and M represents the threshold credits.

In some embodiments, the controller 104 determines whether the fourth processor credits are not smaller than the threshold through the following formula:

$$(\min(M, m \times (T - t - t_p)) + L - y_{i+1}) \geq M \quad (7)$$

where L represents the current processor credits, m represents the processor credits that may be accrued within a unit time when the service is running at a utilization rate lower than the threshold utilization rate, T represents the first time length between the first time instant t1 and second time instant t2, t represents the second time length for the first set of time periods $t_{p1} \ldots t_{pn}$, $t_p$ represents the time length for the second group of time periods $t_{pn+1}$, $y_{i+1}$ represents the processor credits to be consumed within the second set of time periods $t_{pn+1}$, M represents the threshold credits, and min represents a minimum value.

If the fourth processor credits are greater than or equal to the threshold credits, at block 414, the controller 104 performs the second operation within the second set of time periods $(t_{pn+1})$.

If the fourth processor credits are smaller than the threshold credits, at block 416, the controller 104 stops the second operation.

Determining whether to perform the second operation within the second set of time periods by employing the above method may effectively, quickly and accurately determine the processor credits at the second time instant, and more accurately predict the processor credits to be consumed within the second set of time periods based on a relationship with the historical processor credits, thereby making the prediction result more accurate.

Figure 5:
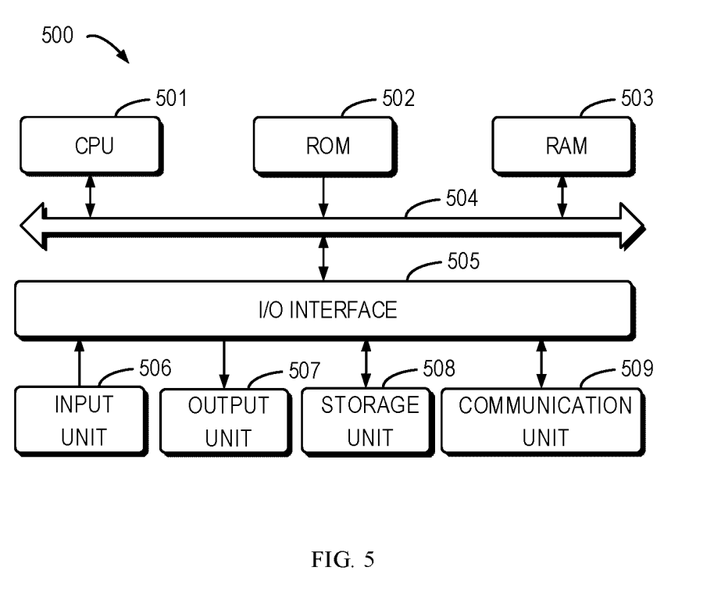
FIG. 5 illustrates a block diagram of an example device 500 adapted to implement an embodiment of the content of the present disclosure.

FIG. 5 illustrates a schematic block diagram of an exemplary device 500 that may be used to implement an embodiment of the content of the present disclosure. For example, the controller 104 shown in FIG. 1 may be implemented by the device 500. As depicted, the device 500 includes a central processing unit (CPU) 501 which is capable of performing various proper actions and processes in accordance with a computer program instruction stored in a read only memory (ROM) 502 or a computer program instruction loaded from a storage unit 508 to a random access memory (RAM) 503. Various programs and data needed in the operation of the device 500 may also be stored in the RAM 503. The CPU 501, the ROM 502 and the RAM 503 are connected to one another via a bus 504. An input/output (I/O) interface 505 is also connected to the bus 504.

The following components in the device 500 are connected to the I/O interface 505: an input unit 506 including a keyboard, a mouse, or the like; an output unit 507, e.g., various displays and loudspeakers; a storage unit 508 such as a magnetic disk, an optical disk or the like; and a communication unit 509 such as a network card, a modem, a radio communication transceiver. The communication unit 509 allows the device 500 to exchange information/data with other devices via a computer network such as Internet and/or various telecommunication networks.

The above-described procedures and processes, such as methods 200 and 400, may be implemented by the processing unit 501. For example, in some embodiments, the methods 200 and 400 may be implemented as a computer software program, which is tangibly included in a machine-readable medium such as storage unit 508. In some embodiments, part or all of the computer program may be loaded and/or installed on the device 500 via the ROM 502 and/or the communication unit 509. When the computer program is uploaded to the RAM 503 and executed by the CPU 501, one or more steps of the above methods 200 and 400 may be implemented.

The present disclosure may be a method, a device, a system and/or a computer program product. The computer program product may include a computer readable storage medium (or media) having computer readable program instructions thereon for carrying out aspects of the present disclosure.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method comprising:
   in response to processor credits for a service reaching threshold credits at a first time instant (t1), determining a second time instant (t2) when a first operation for the service is to be performed, the processor credits indicating a time length in which virtual processor resources of a processor for the service are consumed at a utilization rate exceeding a threshold utilization rate, wherein the first operation is to be performed periodically;
   determining, based on a set of historical processor credits consumed for performing a second operation for the service in a first set of time periods ($t_{p1} \ldots t_{pn}$) between the first time instant (t1) and the second time instant (t2), first processor credits to be consumed in a second set of time periods ($t_{pn+1}$) between the first time instant (t1) and the second time instant (t2) for performing the second operation, the second set of time periods ($t_{pn+1}$) being later than the first set of time periods ($t_{p1} \ldots t_{pn}$);
   determining, based on a first time length from the first time instant (t1) to the second time instant (t2), a second time length of the first set of time periods ($t_{p1} \ldots t_{pn}$) and a third time length of the second set of time periods ($t_{pn+1}$), second processor credits that can be obtained between a third time instant (t3) when the second set of time periods ($t_{pn+1}$) ends and the second time instant (t2); and
   in response to the first, second and third processor credits satisfying a predetermined condition, performing the second operation within the second set of time periods ($t_{pn+1}$), the third processor credits being current processor credits determined from the threshold credits and the set of historical processor credits, wherein performing the second operation consumes the virtual processor resources of the processor and wherein the second operation is performed non-periodically.

2. The method according to claim 1, wherein determining a second time instant (t2) when a first operation for the service is to be performed comprises:
   determining the second time instant (t2) based on at least one of the following: a predetermined time instant or a historical time instant when the first operation is performed.

3. The method according to claim 1, wherein determining second processor credits that can be obtained between a third time instant (t3) when the second set of time periods ($t_{pn+1}$) ends and the second time instant (t2) comprises:
   determining a fourth time length from the third time instant (t3) to the second time instant (t2) based on the first, second and third time length; and
   determining the second processor credits that can be obtained between the third time instant (t3) and the second time instant (t2) based on the fourth time length.

4. The method according to claim 1, wherein performing the second operation comprises:
   determining fourth processor credits that is available to the service at the second time instant (t2) based on the first, second and third processor credits; and
   in response to the fourth processor credits being not smaller than the threshold credits, performing the second operation for the second set of time periods ($t_{pn+1}$).

5. The method according to claim 1, further comprising:
   in response to the first, second and third processor credits not satisfying the predetermined condition, stopping the second operation.

6. An electronic device comprising:
   a processor; and
   a memory having computer program instructions stored thereon, the computer program instructions when executed by the processor, causing the electronic device to perform operations, the operations comprising:
   in response to processor credits for a service reaching threshold credits at a first time instant (t1), determining a second time instant (t2) when a first operation for the service is to be performed, the processor credits indicating a time length in which virtual processor resources of a processor for the service are consumed at a utilization rate exceeding a threshold utilization rate, wherein the first operation is to be performed periodically;
   determining, based on a set of historical processor credits consumed for performing a second operation for the service in a first set of time periods ($t_{p1} \ldots t_{pn}$) between the first time instant (t1) and the second time instant (t2), first processor credits to be consumed in a second set of time periods ($t_{pn+1}$) between the first time instant (t1) and the second time instant (t2) for performing the second operation, the second set of time periods ($t_{pn+1}$) being later than the first set of time periods ($t_{p1} \ldots t_{pn}$);
   determining, based on a first time length from the first time instant (t1) to the second time instant (t2), a second time length of the first set of time periods ($t_{p1} \ldots t_{pn}$) and a third time length of the second set of time periods ($t_{pn+1}$), second processor credits that can be obtained between a third time instant (t3) when the second set of time periods ($t_{pn+1}$) ends and the second time instant (t2); and
   in response to the first, second and third processor credits satisfying a predetermined condition, performing the second operation within the second set of time periods ($t_{pn+1}$), the third processor credits being current processor credits determined from the threshold credits and the set of historical processor credits, wherein performing the second operation consumes the virtual processor resources of the processor and wherein the second operation is performed non-periodically.

7. The electronic device according to claim 6, wherein determining a second time instant (t2) when a first operation for the service is to be performed comprises:
   determining the second time instant (t2) based on at least one of the following: a predetermined time instant or a historical time instant when the first operation is performed.

8. The electronic device according to claim 6, wherein determining second processor credits that can be obtained between a third time instant (t3) when the second set of time periods ($t_{pn+1}$) ends and the second time instant (t2) comprises:
   determining a fourth time length from the third time instant (t3) to the second time instant (t2) based on the first, second and third time length; and determining the second processor credits that can be obtained between the third time instant (t3) and the second time instant (t2) based on the fourth time length.

9. The electronic device according to claim 6, wherein performing the second operation comprises:
determining fourth processor credits that is available to the service at the second time instant (t2) based on the first, second and third processor credits; and
in response to the fourth processor credits being not smaller than the threshold credits, performing the second operation for the second set of time periods ($t_{pn+1}$).

10. The electronic device according to claim 6, wherein the operations further comprise:
in response to the first, second and third processor credits not satisfying the predetermined condition, stopping the second operation.

11. A non-transitory computer-readable medium comprising machine-executable instructions which, when executed, cause a machine to perform operations, the operations comprising:
in response to processor credits for a service reaching threshold credits at a first time instant (t1), determining a second time instant (t2) when a first operation for the service is to be performed, the processor credits indicating a time length in which virtual processor resources of a processor for the service are consumed at a utilization rate exceeding a threshold utilization rate, wherein the first operation is to be performed periodically;
determining, based on a set of historical processor credits consumed for performing a second operation for the service in a first set of time periods ($t_{p1} \ldots t_{pn}$) between the first time instant (t1) and the second time instant (t2), first processor credits to be consumed in a second set of time periods ($t_{pn+1}$) between the first time instant (t1) and the second time instant (t2) for performing the second operation, the second set of time periods ($t_{pn+1}$) being later than the first set of time periods ($t_{p1} \ldots t_{pn}$);
determining, based on a first time length from the first time instant (t1) to the second time instant (t2), a second time length of the first set of time periods ($t_{p1} \ldots t_{pn}$) and a third time length of the second set of time periods ($t_{pn+1}$), second processor credits that can be obtained between a third time instant (t3) when the second set of time periods ($t_{pn+1}$) ends and the second time instant (t2); and
in response to the first, second and third processor credits satisfying a predetermined condition, performing the second operation within the second set of time periods ($t_{pn+1}$), the third processor credits being current processor credits determined from the threshold credits and the set of historical processor credits, wherein performing the second operation consumes the virtual processor resources of the processor and wherein the second operation is performed non-periodically.

12. The computer program product according to claim 11, wherein determining a second time instant (t2) when a first operation for the service is to be performed comprises:
determining the second time instant (t2) based on at least one of the following: a predetermined time instant or a historical time instant when the first operation is performed.

13. The computer program product according to claim 11, wherein determining second processor credits that can be obtained between a third time instant (t3) when the second set of time periods ($t_{pn+1}$) ends and the second time instant (t2) comprises:
determining a fourth time length from the third time instant (t3) to the second time instant (t2) based on the first, second and third time length; and
determining the second processor credits that can be obtained between the third time instant (t3) and the second time instant (t2) based on the fourth time length.

14. The computer program product according to claim 11, wherein performing the second operation comprises:
determining fourth processor credits that is available to the service at the second time instant (t2), based on the first, second and third processor credits; and
in response to the fourth processor credits being not smaller than the threshold credits, performing the second operation for the second set of time periods ($t_{pn+1}$).

15. The computer program product according to claim 11, wherein the operations further comprise:
in response to the first, second and third processor credits not satisfying the predetermined condition, stopping the second operation.

* * * * *